United States Patent
Zhang et al.

(10) Patent No.: US 11,395,308 B2
(45) Date of Patent: Jul. 19, 2022

(54) MONITORING-BASED EDGE COMPUTING SERVICE WITH DELAY ASSURANCE

(71) Applicant: Fujitsu Limited, Kawasaki (JP)

(72) Inventors: Qiong Zhang, Plano, TX (US); Qingya She, Allen, TX (US); Weisheng Xie, Plano, TX (US); Paparao Palacharla, Richardson, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/399,237

(22) Filed: Apr. 30, 2019

(65) Prior Publication Data

US 2020/0351900 A1    Nov. 5, 2020

(51) Int. Cl.
| | |
|---|---|
| H04W 72/08 | (2009.01) |
| H04W 4/029 | (2018.01) |
| H04L 47/80 | (2022.01) |
| H04W 72/04 | (2009.01) |
| H04M 15/00 | (2006.01) |

(52) U.S. Cl.
CPC ......... *H04W 72/085* (2013.01); *H04L 47/805* (2013.01); *H04M 15/8044* (2013.01); *H04W 4/029* (2018.02); *H04W 72/048* (2013.01)

(58) Field of Classification Search
None
See application file for complete search history.

(56) References Cited

U.S. PATENT DOCUMENTS

| | | | | |
|---|---|---|---|---|
| 2009/0089408 | A1* | 4/2009 | Bou-Diab | H04L 45/16 709/220 |
| 2010/0027427 | A1* | 2/2010 | Kokje | H04L 45/122 370/238 |
| 2017/0104847 | A1* | 4/2017 | Zhang | H04L 67/327 |
| 2018/0109590 | A1* | 4/2018 | Rao | H04W 4/029 |

(Continued)

OTHER PUBLICATIONS

Tiwari , V. S., et al., Route prediction using trip observations and map matching, 2013 3rd IEEE International Advance Computing Conference (IACC), 2013.

(Continued)

*Primary Examiner* — Lance Leonard Barry
*Assistant Examiner* — Mohammad Yousuf A. Mian
(74) *Attorney, Agent, or Firm* — Baker Botts L.L.P.

(57) ABSTRACT

Systems and methods for allocating edge computing resources may receive a predicted user route defining multiple wireless access points available along the route at respective time points and an assured delay constraint, determine, for each wireless access point, datacenters in the network meeting the assured delay constraint when accessed through the wireless access point, and construct an auxiliary graph dependent on the predicted user route and the determined datacenters. Each determined datacenter is represented by at least one node in the graph and each path in the graph defines a sequence of datacenters and a corresponding sequence of wireless access points through which they are accessible. A lowest cost path in the graph is determined and the sequences of datacenters and wireless access points defined by the lowest cost path are provided to a resource orchestrator that allocates edge computing resources for a mobile user traversing the predicted user route.

16 Claims, 8 Drawing Sheets

(56) References Cited

U.S. PATENT DOCUMENTS

| | | | |
|---|---|---|---|
| 2019/0104413 A1* | 4/2019 | Cidon | H04L 41/22 |
| 2019/0140933 A1* | 5/2019 | Guim Bernat | H04L 45/125 |
| 2019/0158606 A1* | 5/2019 | Guim Bernat | H04W 4/70 |
| 2019/0245789 A1* | 8/2019 | Sabella | H04M 15/66 |
| 2020/0320397 A1* | 10/2020 | Liu | G06N 3/04 |

OTHER PUBLICATIONS

Wang, Lin, et al. "Online resource allocation for arbitrary user mobility in distributed edge clouds." *2017 IEEE 37th International Conference on Distributed Computing Systems (ICDCS)*. IEEE, 2017; 10 pages.

Taleb, Tarik, et al., "Follow-me cloud: When cloud services follow mobile users." *IEEE Transactions on Cloud Computing* (2016); 14 pages.

\* cited by examiner

MONITORING-BASED EDGE COMPUTING SERVICE WITH DELAY ASSURANCE

BACKGROUND

Field of the Disclosure

The present disclosure relates generally to resource allocation in edge computing networks and, more particularly, to a monitoring-based edge computing service with delay assurance that minimizes datacenter migration costs.

Description of the Related Art

Emerging network applications, such as cloud and big data applications, may involve resources residing within one or more data centers (DCs) in one or more network domains. Network function virtualization (NFV) can be used to virtualize network functions and to migrate them from devices that are built for a single, specific purpose to multi-purpose virtual machines, which may reduce service deployment costs and improve service flexibility. As more service functions move to virtual machines in geographically distributed datacenters and as more individually-managed Networks-on-Demand are enabled by software defined networking (SDN) technology, network services may implement various mechanisms to coordinate resources across these networks.

Multi-access edge computing (MEC) is an emerging edge computing technology that enables cloud computing capabilities and an IT service environment at the edge of a cellular network or, more generally, at the edge of any edge computing network. With MEC technology, the performance of a mobile user's applications may be improved by performing various computing tasks on edge nodes closer to the mobile user. In addition, MEC technology, which is typically implemented at base stations or other edge nodes, may allow cellular network operators to open their radio access network (RAN) to authorized third parties, such as application developers and content providers.

Fifth generation wireless (5G) networks must support mission-critical, delay-sensitive services for applications such as Internet of Things (IoT) platforms, auto-driving cars, and service-oriented slicing. These networks may include SDN and NFV, which support the underlying physical infrastructure. For certain applications, 5G services have very restricted delay constraints, must support multiple access technologies and access points, and must support a wide variety of mobile users and their respective mobile devices.

SUMMARY

In one aspect, a method for allocating resources among edge computing nodes is disclosed. The method includes receiving input data indicating a predicted user route and an assured delay constraint, the input data specifying a plurality of wireless access points for an edge computing network available along the predicted user route at each of multiple time points, determining, for each of the plurality of wireless access points, one or more datacenters in the edge computing network for which the assured delay constraint is met when the datacenter is accessed through the wireless access point, and constructing an auxiliary graph dependent on the predicted user route and the determination, for each wireless access point, of the one or more datacenters in the edge computing network for which the assured delay constraint is met when the datacenter is accessed through the wireless access point. Each of the datacenters is represented by at least one node in the auxiliary graph and each of multiple paths in the auxiliary graph defines a respective sequence of datacenters and a respective sequence of wireless access points through which each of the datacenters in the sequence of datacenters is accessible. The method also includes determining a lowest cost one of the multiple paths in the auxiliary graph, providing the respective sequence of datacenters and the respective sequence of wireless access points defined by the lowest cost path in the auxiliary graph to a resource orchestrator for the edge computing network, and allocating, by the resource orchestrator, resources for a given user on the predicted user route in accordance with the respective sequence of datacenters and the respective sequence of wireless access points defined by the lowest cost path.

In any of the disclosed embodiments, constructing the auxiliary graph may include, for each of the multiple time points, generating a node in the auxiliary graph for each datacenter associated with each wireless access point accessible at the time point, and, for each pair of nodes in the auxiliary graph representing datacenters accessible at consecutive ones of the multiple time points, assigning a respective link weight to a connection between the two nodes of the pair of nodes in the auxiliary graph. Determining the lowest cost path in the auxiliary graph may be dependent on the respective link weights assigned to the connections between the two nodes of each pair of nodes in the auxiliary graph representing datacenters accessible at consecutive ones of the multiple time points.

In any of the disclosed embodiments, constructing the auxiliary graph may further include generating a source node connected to all nodes representing datacenters accessible at a first predicted time point of the multiple time points, and generating a destination node connected to all nodes representing datacenters accessible at a last predicted time point of the multiple time points. Each of the multiple paths in the auxiliary graph may define a respective sequence of datacenters and a respective sequence of wireless access points represented by nodes between the source node and the destination node in the path.

In any of the disclosed embodiments, for each pair of nodes in the auxiliary graph representing datacenters accessible at consecutive ones of the multiple time points, assigning the respective link weight may be dependent on a cost of migrating data between the two nodes of the pair of nodes or a cost of migrating a computation task between the two nodes of the pair of nodes.

In any of the disclosed embodiments, for each pair of nodes in the auxiliary graph representing datacenters accessible at consecutive ones of the multiple time points, assigning the respective link weight may be dependent on a number of hops between the two nodes of the pair of nodes.

In any of the disclosed embodiments, determining the lowest cost path in the auxiliary graph may include determining that, according to a first cost parameter, two or more paths have a same lowest cost, and comparing a second cost parameter for the two or more paths to determine the lowest cost path.

In any of the disclosed embodiments, the predicted user route may be specific to the given user.

In any of the disclosed embodiments, determining, for each of the plurality of wireless access points, the one or more datacenters in the edge computing network for which the assured delay constraint is met when the datacenter is accessed through the wireless access point may include monitoring delay amounts between pairs of datacenters, and monitoring delay amounts between datacenters and the wireless access points through which they are accessed.

In any of the disclosed embodiments, the predicted user route may represent a first portion of an extended user route that includes a second portion along which one or more additional wireless access points for the edge computing network are available at one or more additional time points. The method may further include determining, for each additional wireless access point, one or more datacenters in the edge computing network for which the assured delay constraint is met when the datacenter is accessed through the additional wireless access point, and updating the auxiliary graph dependent on the second portion of the extended user route and the determination, for each additional wireless access point, of the one or more datacenters in the edge computing network for which the assured delay constraint is met when the datacenter is accessed through the additional wireless access point. The updating may include adding one or more additional nodes at each of the additional time points and adding one or more additional paths each defining an additional sequence of datacenters and an additional sequence of the additional wireless access points through which each datacenter in the additional sequence of datacenters is accessible. The method may further include determining a lowest cost one of the additional paths in the auxiliary graph, providing the additional sequence of datacenters and the additional sequence of the additional wireless access points defined by the lowest cost one of the additional paths to the resource orchestrator, and allocating, by the resource orchestrator, additional resources for the given user on the second portion of the extended user route in accordance with the additional sequence of datacenters and the additional sequence of wireless access points defined by the lowest cost one of the additional paths to the resource orchestrator.

In any of the disclosed embodiments, the predicted user route may represent a portion of an extended user route along which one or more additional wireless access points for the edge computing network are available at one or more additional time points. The method may further include, while the given user moves along the extended user route, dynamically determining, for each additional wireless access point, one or more datacenters in the edge computing network for which the assured delay constraint is met when the datacenter is accessed through the additional wireless access point, and dynamically updating the auxiliary graph dependent on the extended user route and the determination, for each additional wireless access point, of the one or more datacenters in the edge computing network for which the assured delay constraint is met when the datacenter is accessed through the additional wireless access point. The updating may include extending the lowest cost path to include an extension of the respective sequence of datacenters and an extension of the respective sequence of wireless access points defined by the lowest cost path. The method may also include providing the extended sequence of datacenters and the extended sequence of wireless access points to the resource orchestrator, and allocating, by the resource orchestrator, additional resources for the given user on the extended user route in accordance with the extended sequence of datacenters and the extended sequence of wireless access points.

In another aspect, a system for allocating resources among edge computing nodes is disclosed. The system includes an edge computing network including a plurality of datacenters, a plurality of wireless access points, each configured to access a subset of the plurality of datacenters on behalf of users, a resource orchestrator, and a monitoring subsystem. The monitoring subsystem includes a first processor having access to memory media storing first instructions executable by the first processor to receive input data indicating a predicted user route associated with an assured delay constraint, the input data specifying a subset of the plurality of wireless access points available along the predicted user route at each of multiple time points, to determine, for each wireless access point in the subset of wireless access points, one or more datacenters in the subset of datacenters accessible by the wireless access point for which the assured delay constraint is met when the datacenter is accessed through the wireless access point, and to construct an auxiliary graph dependent on the predicted user route and the determination of the one or more of the subset of datacenters accessible by each wireless access point for which the assured delay constraint is met when the datacenter is accessed through the wireless access point. Each of the one or more datacenters of the subset of datacenters accessible by each wireless access point is represented by at least one node in the auxiliary graph and each of multiple paths in the auxiliary graph defines a respective sequence of datacenters and a respective sequence of wireless access points through which each of the datacenters in the sequence of datacenters is accessible. The first instructions are further executable to cause the first processor to determine a lowest cost one of the multiple paths in the auxiliary graph, and to provide the respective sequence of datacenters and the respective sequence of wireless access points defined by the lowest cost path in the auxiliary graph to the resource orchestrator. The resource orchestrator includes a second processor having access to memory media storing second instructions executable by the second processor to allocate resources for a given user on the predicted user route in accordance with the respective sequence of datacenters and the respective sequence of wireless access points defined by the lowest cost path.

In any of the disclosed embodiments, the plurality of datacenters may include one or more datacenters at an edge computing layer, one or more datacenters at a fog computing layer closer to the users on whose behalf the plurality of wireless access points access the subsets of the plurality of datacenters than the one or more datacenters at the edge computing layer, and one or more datacenters at a cloud computing layer farther from the users on whose behalf the plurality of wireless access points access the subsets of the plurality of datacenters than the one or more datacenters at the edge computing layer.

In any of the disclosed embodiments, the first instructions may be further executable to cause the first processor to determine the assured delay constraint for the predicted user route.

In any of the disclosed embodiments, to construct the auxiliary graph, the first instructions may be further executable to cause the first processor to, for each of the multiple time points, generate a node in the auxiliary graph for each datacenter associated with each wireless access point accessible at the time point, and, for each pair of nodes in the auxiliary graph representing datacenters accessible at consecutive ones of the multiple time points, assign a respective link weight to a connection between the two nodes of the pair of nodes in the auxiliary graph. Determining the lowest cost path in the auxiliary graph may be dependent on the respective link weights assigned to the connections between the two nodes of each pair of nodes in the auxiliary graph representing datacenters accessible at consecutive ones of the multiple time points.

In any of the disclosed embodiments, to construct the auxiliary graph, the first instructions may be further executable to cause the first processor to generate a source node connected to all nodes representing datacenters accessible at a first predicted time point of the multiple time points, and to generate a destination node connected to all nodes representing datacenters accessible at a last predicted time point of the multiple time points. Each of the multiple paths in the auxiliary graph may define a respective sequence of datacenters and a respective sequence of wireless access points represented by nodes between the source node and the destination node in the path.

In any of the disclosed embodiments, for each pair of nodes in the auxiliary graph representing datacenters accessible at consecutive ones of the multiple time points, the first instructions may be further executable to cause the first processor to assign the respective link weight dependent on a cost of migrating data between the two nodes of the pair of nodes, a cost of migrating a computation task between the two nodes of the pair of nodes, or a number of hops between the two nodes of the pair of nodes.

In any of the disclosed embodiments, to determine the lowest cost path in the auxiliary graph, the first instructions may be further executable to cause the first processor to determine that, according to a first cost parameter, two or more paths have a same lowest cost, and to compare a second cost parameter for the two or more paths to determine the lowest cost path.

In any of the disclosed embodiments, the first instructions may be further executable to cause the first processor to determine the predicted user route dependent on monitoring data associated with the given user.

In any of the disclosed embodiments, to determine, for each wireless access point in the subset of wireless access points, the one or more datacenters in the subset of datacenters accessible by the wireless access point for which the assured delay constraint is met when the datacenter is accessed through the wireless access point, the first instructions may be further executable to cause the first processor to monitor delay amounts between pairs of datacenters, and to monitor delay amounts between datacenters and the wireless access points through which they are accessed.

In any of the disclosed embodiments, the predicted user route may represent a portion of an extended user route along which one or more additional wireless access points for the edge computing network are available at one or more additional time points. The first instructions may be further executable to cause the first processor to, while the given user moves along the extended user route, dynamically determine, for each additional wireless access point, one or more datacenters in the edge computing network for which the assured delay constraint is met when the datacenter is accessed through the additional wireless access point, and dynamically update the auxiliary graph dependent on the extended user route and the determination, for each additional wireless access point, of the one or more datacenters in the edge computing network for which the assured delay constraint is met when the datacenter is accessed through the additional wireless access point. The updating may include extending the lowest cost path to include an extension of the respective sequence of datacenters and an extension of the respective sequence of wireless access points defined by the lowest cost path. The first instructions may be further executable to cause the first processor to provide the extended sequence of datacenters and the extended sequence of wireless access points to the resource orchestrator. The second instructions may be further executable to cause the second processor to allocate additional resources for the given user on the extended user route in accordance with the extended sequence of datacenters and the extended sequence of wireless access points.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

Figure 1:
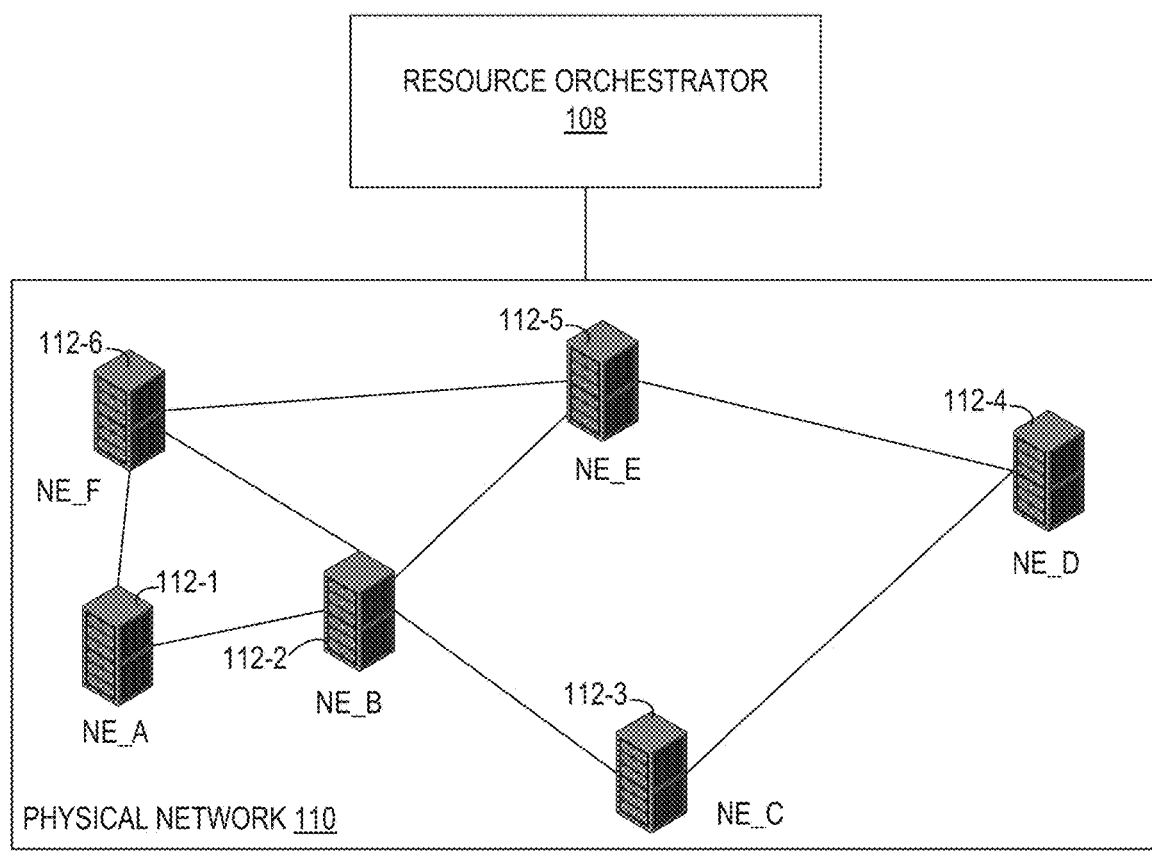
FIG. 1 illustrates selected elements of a resource orchestration framework, according to at least some embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

As will be described herein, as a mobile user moves through different service areas of an edge computing network, each including respective wireless access points through which edge computing resources are accessible, the data and/or computing task associated with the user may be migrated between edge computing (or storage) nodes following the movement of the user. In some embodiments, the systems and methods for allocating edge computing resources described herein may minimize the costs associated with migrating a mobile user's data and/or computing tasks between edge computing nodes, while guaranteeing that an assured delay constraint between the user and the edge computing resources allocated for the user's data and/or computing tasks is met at all points along the user's route.

The techniques described herein for resource allocation among edge computing nodes may take into consideration the unique conditions applicable in 5G edge computing, including the availability of multiple wireless access points and an assured delay constraint between a user and the edge nodes that provide storage and computing services to the user, when determining resource allocations for user-mobility based virtual machine (VM) migration. An auxiliary graph may be constructed based on a predicted user route and various delays monitored by system-level components. Using the auxiliary graph, a migration sequence between edge computing nodes and a corresponding sequence of wireless access points through which a mobile user can access those edge computing nodes may be determined.

In some embodiments, the systems and method described herein may be applied in systems that include network function virtualization, mobile edge computing, and/or IoTs with data analytics including, in some cases, systems in which traffic traverses a sequence of service function instances across multiple domains.

Turning now to the drawings, FIG. 1 illustrates selected elements of a resource orchestration framework, according to at least some embodiments. More specifically, FIG. 1 illustrates an example embodiment of a network domain 100, which is based on vertices that are individual network elements (NE). In FIG. 1, network domain 100 is shown including resource orchestrator 108, and physical network 110. In some embodiments, physical network 110 may be an underlying optical network, such as an optical transport network (OTN) or a flexible optical data plane (e.g., flexible transceivers) configured to adjust the bandwidth of connections. In some embodiments, resource orchestrator 108 may be a domain-specific resource orchestrator in a multi-domain network.

In FIG. 1, resource orchestrator 108 may manage or coordinate the use of resources within network domain 100, shown comprising multiple network elements 112. Network elements 112 may represent various types of network functionality, such as switches, routers, etc., and may include hardware to interconnect various types of physical interfaces. Network domain 100 comprises network element NE_A 112-1, network element NE_B 112-2, network element NE_C 112-3, network element NE_D 112-4, network element NE_E 112-5, and network element NE_F 112-6, along with connections between the network elements that may have different distances. Thus, network domain 100 may represent a network topology for a single network domain, the use of whose resources are coordinated by resource orchestrator 108. Note that, in some embodiments, various network management functions for network domain 100 other than those provided by resource orchestrator 108 may be provided by a dedicated (e.g., domain-specific) SDN controller (not shown). When larger networks include multiple network domains, each individual network domain may be managed by a respective SDN controller.

In some embodiments, network domain 100 may be included in a multi-domain network that uses a distributed processing approach and in which controller messages are exchanged between a plurality of resource orchestrators and/or network controllers, such as resource orchestrator 108 and/or an SDN controller, each of which is associated with a respective one of a plurality of network domains, such as physical network 110. As previously noted, network function virtualization (NFV) may be used to virtualize network functions and migrate them from devices that are built for a single, specific purpose to multi-purpose virtual machines on commercial off-the-shelf servers, which may reduce service deployment costs and improve service flexibility. In some embodiments, one or more resource orchestrators may collectively or individually manage and coordinate the use of various resources (including service functions, virtual machines, and networks) at each of a plurality of datacenters, as well as the associated network resources to interconnect the datacenters. For example, a network service may span across multiple networks such as consumer broadband, mobile backhaul, mobile packet core, and/or virtual private networks (including, e.g., networks implemented on the 1Finity™ platform from Fujitsu Network Communications Inc.).

In various embodiments of the present disclosure, a network may include multiple domains, and these domains may have different network technologies, different vendors, different administration, different types of resources, and/or different virtualized networks. These domains may include domains in which reside Internet of Things (IoT) devices, computing resources, storage resources, and/or different types of service functions (including access service functions, metro service functions, and/or core service functions). In at least some embodiments, these multi-domain networks may preserve confidentiality among domains and improve scalability for service providers. In at least some multi-domain orchestration architectures, each domain may be controlled by a local orchestrator and vertex-centric distributed computing among the orchestrators may provide for end-to-end resource allocation.

In at least some embodiments of the present disclosure, a network, or each domain in a multi-domain network, may include physical nodes and IP/OTN links. In at least some embodiments, a respective resource orchestrator may be associated with each network domain to manage all the physical nodes and links within its domain. In some embodiments, each physical node may include network elements (e.g., OTN switch, router) and/or compute servers and storage elements (e.g., datacenters) capable of invoking a subset of service functions selected from a catalog of service functions or executing applications on behalf of users.

In at least some embodiments, resource orchestrators (such as various instance of resource orchestrator 108 illustrated in FIG. 1) may communicate with each other and may be networked together using any suitable network topology, such as a mesh, a ring, a star, or a bus, among others. Similarly, SDN controllers for respective domains may communicate with each other and may be networked together using any suitable network topology, such as a mesh, a ring, a star, or a bus, among others. In some embodiments, the communication among resource orchestrators 108 and/or among SDN controllers may employ a sideband network channel, or other network connection for management purposes, that does not otherwise interfere with the network connections between vertices, which may represent a payload network offered as a commercial service to customers by a service provider. In some embodiments, a resource orchestrator 108 or an SDN controller for a network domain may keep track of the network topology of its respective network domain. In some embodiments, each network domain may include (or be associated with) a respective resource orchestrator that manages (and coordinates the use of) the physical nodes and links within its domain. These resource orchestrators may be interconnected by control channels (e.g., in-band control channels or out-of-band control channels, in different embodiments). In at least some embodiments, each orchestrator may store information about each physical node as a vertex data structure and may store information about each overlay OTN link as an edge data structure. In at least some embodiments, each vertex data structure may include a current value and a set of incoming/outgoing edges. In at least some embodiments, each edge data structure may include information about a respective OTN link, such as its bandwidth, delay information, information about the cost to use the link, and/or any other information usable in the system to implement functionality described herein. In some embodiments, each vertex may be able to send and/or receive messages to and/or from other vertices. Messages may be delivered in memory (e.g., if they are exchanged between vertices that are within the same network domain or are controlled by the same orchestrator), while messages exchanged between vertices that are in different network domains or are controlled by different orchestrators may be delivered via various control channels.

As previously noted, 5G networks may be designed to support mission-critical, delay-sensitive services for applications such as Internet of Things (IoT) platforms, auto-driving cars, and service-oriented slicing. To that end, a 5G service may be required to support delay constraints that are much tighter than the delay constraints supported in previous protocols and technologies. For example, a 5G service may be designed to support very restricted delay constraints for certain applications, e.g., a delay of a few milliseconds, or a delay specified in nanoseconds. A 5G service may also be designed to support multiple access technologies and multiple access points. In addition, a 5G service may be designed to support mobility for a wide variety of mobile users.

Standards for a 5G service may include requirements on data rates between a mobile device and a distributed unit (DU) and/or central unit (CU) in an edge cloud (e.g., for applications such as ultra-high definition (UHD) video, gaming, augmented or virtual reality, etc.) and between a DU/CU in the edge cloud and various components in a core cloud. Standards for a 5G service may also include requirements on reliability at a mobile device, at an edge cloud, and at a core cloud. For example, at the core cloud, the service may support transmission control protocol (TCP) optimization, an IP multimedia subsystem (IMS), access management, session management, mobility management, and/or a charging function. A 5G service may support security requirements for a massive IoT slice, security requirements at an edge cloud, and security requirements at a core cloud. For example, the core cloud may implement various security features for an IoT server, for access management, and/or for session management. A 5G service may support requirements on latency such as, for example, for a mission-critical IoT slice to/from a vehicle and corresponding vehicle-to-vehicle or vehicle-to-infrastructure (V2X) servers at an edge cloud or at a core cloud.

Figure 2A:
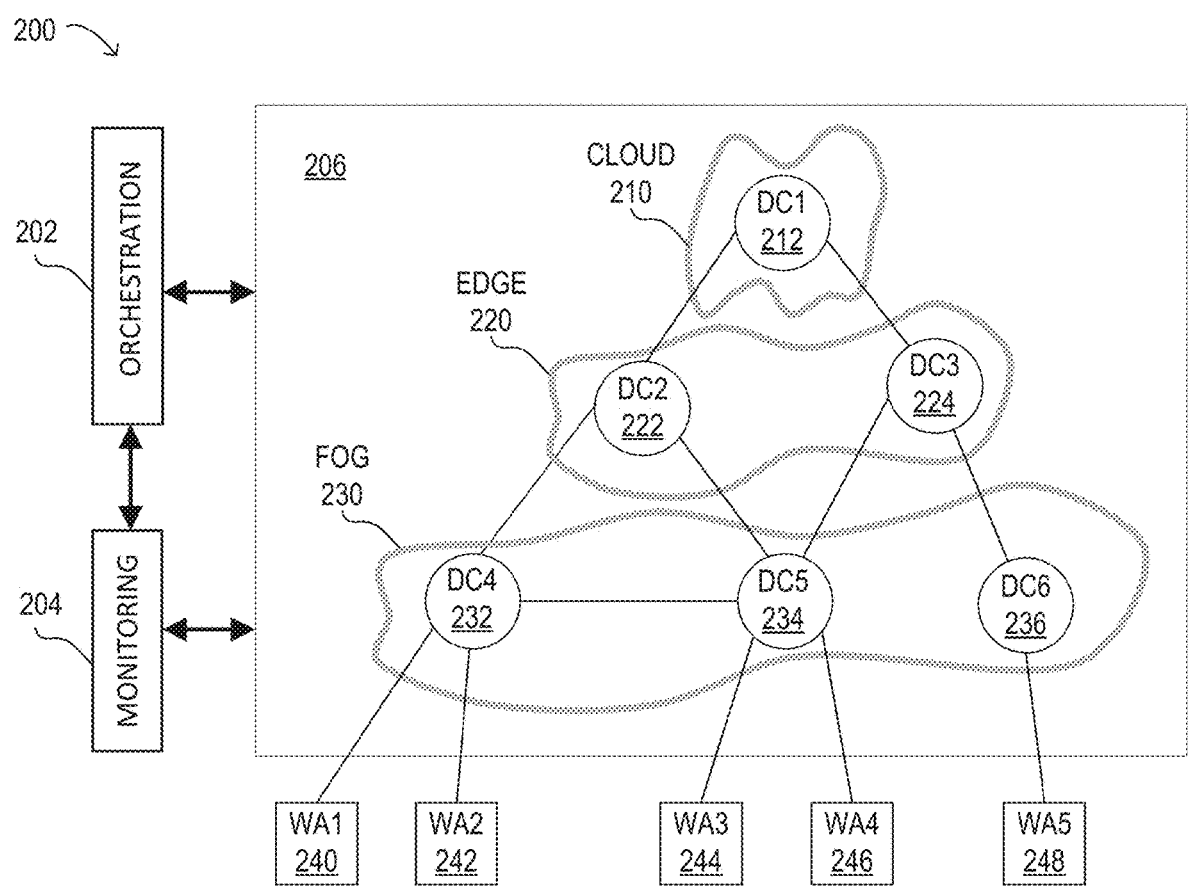
FIG. 2A illustrates an example system for a monitoring-based edge computing service with delay assurance, according to some embodiments.

FIG. 2A illustrates an example system 200 for a monitoring-based edge computing service with delay assurance, according to some embodiments. In various embodiment, edge computing technology may enable support for delay-critical applications and for mobile edge computing as well as for fog computing. Fog computing may be considered a more granular version of edge computing in which there is a larger density and number of small datacenters nearer to users than is typical for the datacenters in edge computing networks.

In the illustrated embodiment, system 200 includes an edge computing network 206, which is associated with one or more orchestration elements 202, such as a resource orchestrator, and one or more monitoring elements 204, such as a monitoring subsystem. Edge computing network 206 includes a core cloud computing layer 210, a mobile edge computing layer 220, and a fog computing layer 230. Each layer includes one or more datacenters (DCs) configured to provide computing and/or storage services to mobile users. Each datacenter is accessible through one or more wireless access points (WAs), shown as WA1 (240) through WA5 (248). In the illustrated embodiment, datacenters at various layers in edge computing network 206 are interconnected in a mesh type topology. In other embodiments, datacenters at various layers in an edge computing network 206 may be interconnected using other types of topologies including, but not limited to, those described herein.

The datacenters in the fog computing layer 230 include DC4 (232), DC5 (234), and DC6 (236). These datacenters are closer to the users to which services are provided than are the datacenters in the mobile edge computing layer 220 and in the core cloud computing layer 210. In the illustrated example, the mobile edge computing layer 220 includes datacenters DC2 (222) and DC3 (224), and the core cloud computing layer 210 includes datacenter DC1 (212). In at least some embodiments, the system 200 integrates edge computing network 206 together with an orchestration element 202, such as a resource orchestrator, and a monitoring element 204, such as a monitoring subsystem.

In at least some embodiments, orchestration element 202 may be configured to provide, without limitation, resource allocation, path computation, and resource migration. In at least some embodiments, monitoring element 204 may be configured to monitor the respective delays between various pairs of datacenters included in edge computing network 206. For example, monitoring element 204 may be configured to monitor the respective delays between pairs of datacenters in the same or different layers of edge computing network 206, including the fog computing layer 230, the edge computing layer 220, and the core cloud computing layer 210. The monitoring element 204 may also be configured to monitor the respective delays between users and various datacenters, such as datacenters DC4 (232), DC5 (234), and DC6 (236) in fog computing layer 230. In at least some embodiments, the monitoring element 204 may also be configured to monitor the respective delays between various wireless access points (WAs) and the datacenters (DCs) that are accessible through them.

Figure 2B:
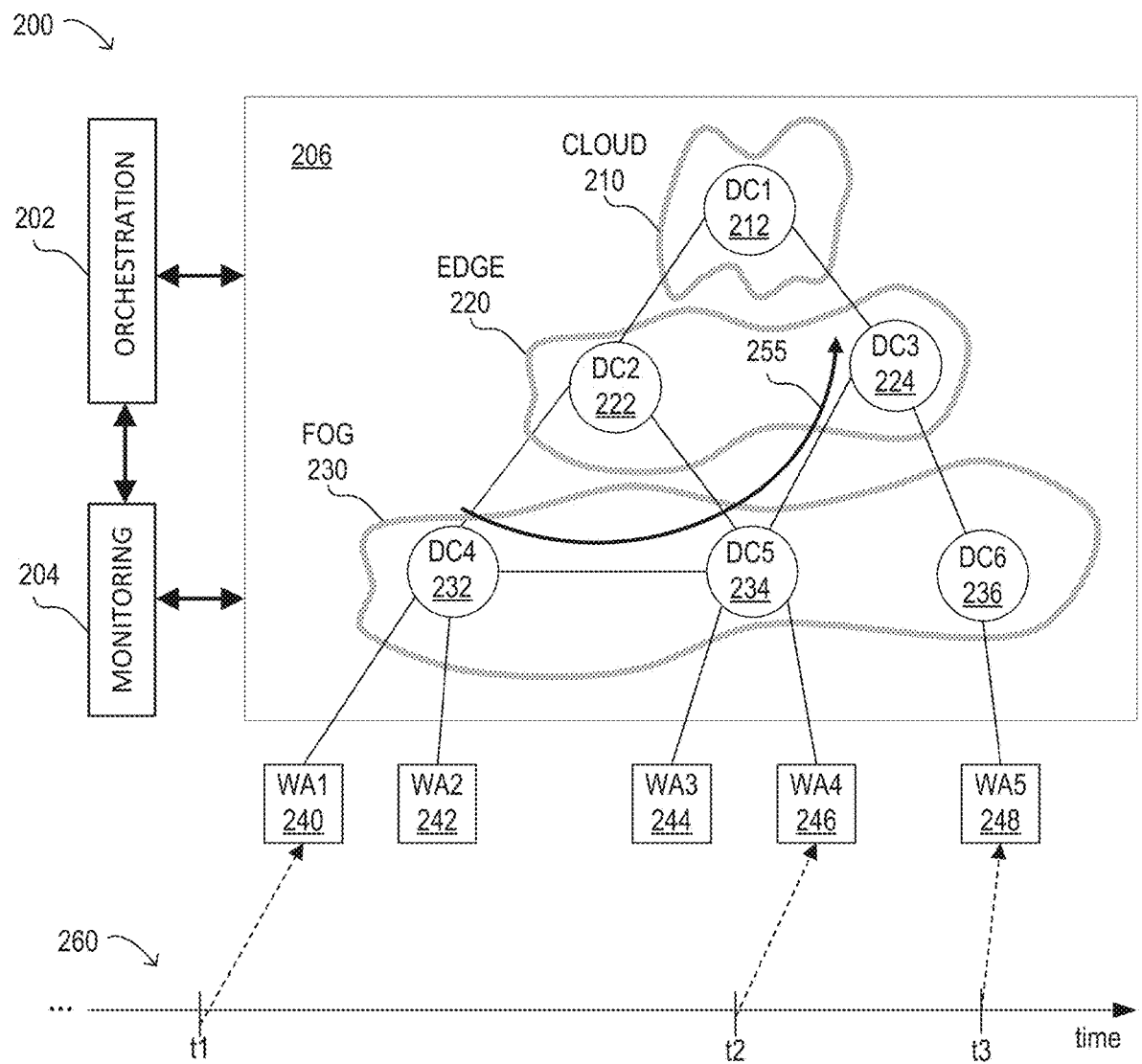
FIG. 2B illustrates a timeline over which a user moves between service areas while receiving computing or storage services, according to one embodiment.

FIG. 2B illustrates a timeline 260 over which a user moves between service areas of system 200 illustrated in FIG. 2A while receiving computing or storage services, according to one embodiment. In the illustrated example, the user moves through different service areas, each of which includes one or more wireless access points, at different points in time. In some existing systems that are not subject to the strict delay constraints of 5G, a single one of the datacenters in the edge computing network 206, such as a single datacenter in core cloud layer 210, might be able to provide computing and/or storage services to the user even as they move between service areas. However, in systems that are subject to the strict delay constraints of 5G, as the user moves between the service areas, at least some data and/or computing tasks associated with the user may have to be migrated between datacenters that host computing and/or storage services, following the movement of the user, in order to guarantee an assured delay constraint between the user and the datacenters storing their data and/or performing computing tasks on their behalf. Such migration of datacenters in response to user movement may be referred to as a "follow me" service. In one example, the datacenter to which the user's data and/or computing tasks are migrated at a given time may be closer to the user than the datacenter on which they were hosted at an earlier point in time. The datacenters to which a user's data and/or computing tasks are migrated may reside at any of the layers in the edge computing network 206, in various embodiments.

In the embodiment illustrated in FIG. 2B, datacenter DC4 (232) is accessible through either wireless access point WA1 (240) or wireless access point WA2 (242), both of which are closer to datacenter DC4 (232) than are other ones of the wireless access points. Similarly, wireless access points WA3 (244) and WA4 (246) are closer to datacenter DC5 (234) than are other wireless access points, and wireless access point WA5 (248) is closer to datacenter DC6 (236) than are other wireless access points.

In the illustrated embodiment, when the user moves into a first service area at time $t_1$, there are two wireless access points, shown as WA1 (240) and WA2 (242), available for accessing computing and/or storage services hosted on edge computing network 206. In this example, WA1 (240) is selected as the best available option and the user's data and/or computing tasks are hosted on (or migrated to) datacenter DC4 (232), which is close to the user in fog computing layer 230, in order to meet an applicable assured delay level constraint. Subsequently, the user accesses datacenter DC4 (232) through wireless access point WA1 (240). Similarly, when the user moves into a second service area at time $t_2$, wireless access point WA4 (246) is selected as the best available option from among available wireless access points WA3 (244) and WA4 (246) and the user's data and/or computing tasks are migrated to datacenter DC5 (234), which is close to the user in fog computing layer 230, in order to meet the applicable assured delay level constraint. Subsequently, the user accesses datacenter DC5 (234) through wireless access point WA4 (246).

In the illustrated embodiment, when the user moves into a third service area at time $t_3$, wireless access point WA5 (248) is selected as the only available option. In this example, the user's data and/or computing tasks could have been migrated to datacenter DC6 (236), which is close to the user in fog computing layer 230, after which the user would access datacenter DC6 (236) through wireless access point WA5 (248). However, if the assured delay level constraint is not as tight at time $t_3$ as it was at times $t_1$ and $t_2$, or if datacenter DC3 (224) has high enough performance to meet the assured delay level constraint between the user and datacenter DC3 (224) though wireless access point WA5 (248) and datacenter DC6 (236), the user's data and/or computing tasks may be migrated to datacenter DC3 (224), which is farther from the user in edge computing layer 220. Subsequently, the user may access datacenter DC3 (224) though wireless access point WA5 (248) and datacenter DC6 (236). In this case, the user's data and/or computing tasks would follow a migration path shown as 255 from DC4 (232) to DC5 (234) to DC3 (224).

The techniques described herein for resource allocation in edge computing systems that provide "follow me" services may, in various embodiments, provide any or all of the following benefits, among others: a guarantee of meeting assured delay constraints, a high throughput and/or data rate, and a reduction in data retransmission between users and wireless access points during a handoff by transmission between the datacenters, thus saving wireless bandwidth. In at least some embodiments, because the datacenters (especially in the fog computing layer) are closer to the receiving storage and/or computing services, the delay between the user and the datacenters providing those services is likely to be shorter, resulting in a high throughput and data rate compared to some existing systems.

The techniques described herein for resource allocation in edge computing systems may, in various embodiments, be applied in systems that provide any or all of the following applications, among others: monitoring and/or profiling for mobile devices, machine learning at the edge or fog computing layers, mobile offloading, and augmented or virtual reality with edge computing. For example, and application for profiling a mobile device may monitor a user and their behavior as they move along an observed or predicted route. In another example, some mobile devices, such as mobile phones, may not be suitable for certain tasks in that they consume too much power or may not have enough computing resources to perform the tasks. In this example, the computing tasks may be offloaded to a nearby datacenter at the fog computing layer, which can perform the tasks and provide a quick response back to the mobile device.

In at least some embodiments, the techniques described herein for resource allocation in edge computing systems that provide "follow me" services may minimize the high cost of migrating a user's data and/or computing tasks between datacenters, while guaranteeing that an applicable assured delay constraint between the datacenters and the user is met. The migration costs may, in various embodiments, include costs for data transmission, when migrating data between edge computing nodes, and costs for service instantiation at new edge computing nodes, when migrating computing tasks to the new edge computing nodes. In at least some embodiments, these migration costs may be reduced by minimizing the number of migrations between datacenters while a user moves along an observed or predicted user route.

In at least some embodiments, given a predicted user route for a particular user, a physical network of edge nodes (datacenters), and an assured delay constraint denoted as Tj, the techniques described herein may be used to allocate resources such that migration costs are minimized while the assured delay constraint is met at all times. The predicted user route may be expressed in terms of a collection of wireless access points that are available to the user for accessing one or more datacenters along the predicted user route at each of multiple time points, $t_p$. In at least some embodiments, the set of one or more datacenters available to provide storage and/or computing services to the user through each wireless access point with the assured delay level Tj may be determined through monitoring, such as by monitoring element 202 illustrated in FIGS. 2A and 2B. For example, monitoring element 202 may be configured to determine, based on data captured during monitoring, which pairs of datacenters meet a first assured delay level constraint and which pairs of datacenters meet a second, longer, assured delay level constraint.

In at least some embodiments, the predicted user route may be determined through monitoring of the user's mobile device, such as by monitoring element 202 illustrated in FIGS. 2A and 2B, over time. For example, monitoring element 202 may be configured to detect patterns in captured data associated with the user's mobile device to predict the route that the user is likely to take at a particular time on a particular day of the week. In some embodiments, monitoring element 202 may be configured to determine the respective distances between pairs of datacenters, such as the number of network hops between datacenters in each of multiple pairs of datacenters.

As described in more detail below, in order to minimize the number of datacenter migrations when providing "follow me" services to a mobile user, an auxiliary graph may be constructed and analyzed to determine the sequence of datacenters and the sequence of corresponding wireless access points through which those datacenters are accessible at particular time points, as defined by the lowest cost path in the auxiliary graph.

Figure 3A:
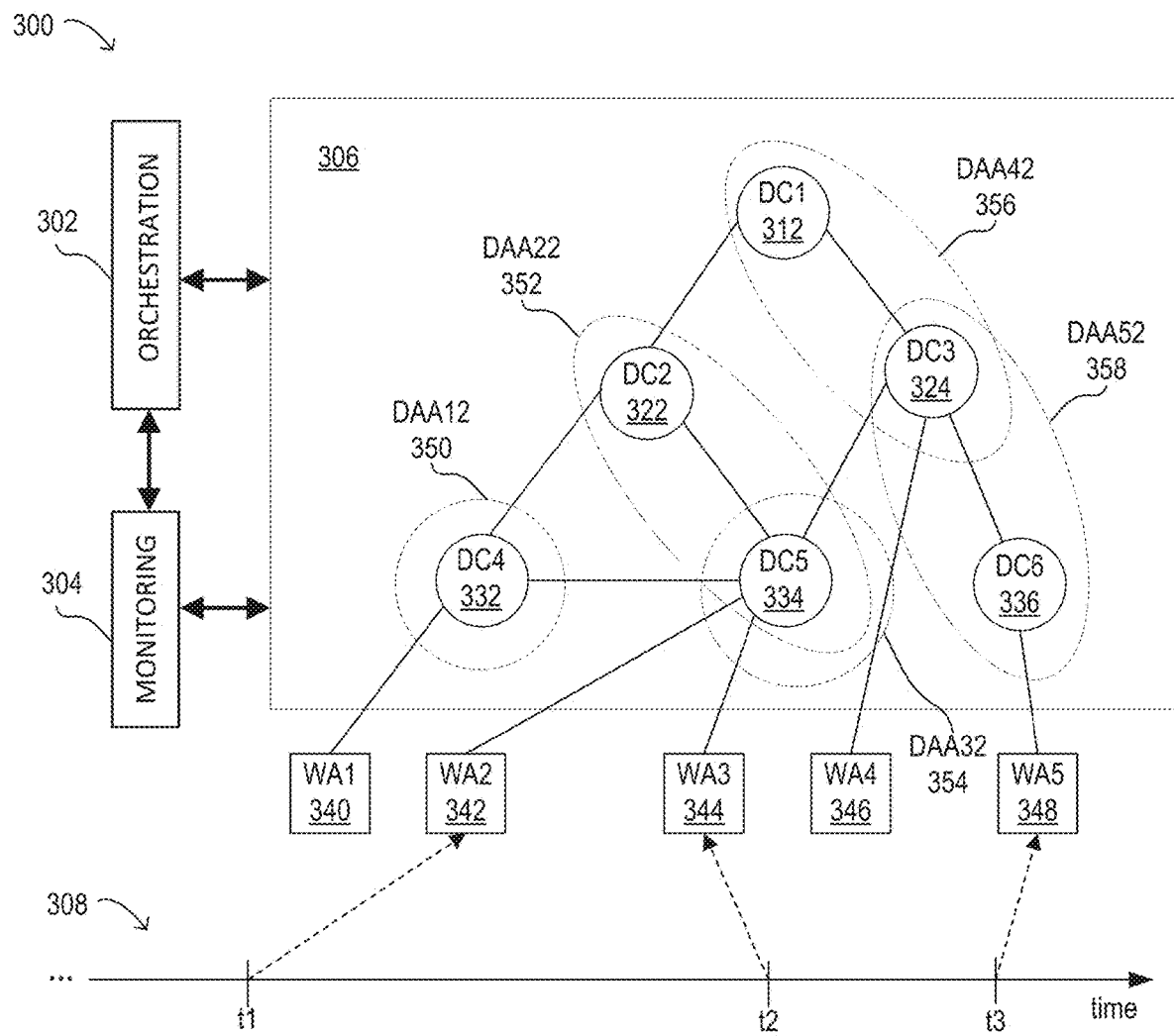
FIG. 3A illustrates a timeline over which a user moves between service areas along a predicted route while receiving computing or storage services, according to one embodiment.

FIG. 3A illustrates a timeline 308 over which a user moves along a predicted route while receiving computing or storage services hosted in an edge computing network 306, according to one embodiment. In the illustrated example, three predicted time points on the predicted user route are shown on timeline 308. As in edge computing network 206 illustrated in FIGS. 2A and 2B, edge computing network 306 includes multiple datacenters distributed between a fog computing layer, an edge computing layer, and a core cloud layer. More specifically, datacenters DC4 (332), DC5 (334), and DC6 (336) reside at the fog computing layer, datacenters DC2 (322) and DC3 (324) reside at the edge computing layer, and datacenter DC1 (312) resides at the core cloud layer of edge computing network 306.

In the illustrated example, the user moves between different service areas of a system 300, each of which includes one or more wireless access points, at different points in time, shown as time $t_1$, time $t_2$, and time $t_3$. In the illustrated example, the predicted route includes the user moving, at time $t_1$, into a service area that includes two available wireless access points shown as WA1 (340) and WA2 (342), moving, at time $t_2$, into a service area that includes two available wireless access points shown as WA3 (344) and WA4 (346), and moving, at time $t_3$, into a service area that includes a single available wireless access point shown as WA5 (348). In the illustrated example, the assured delay level is denoted as T2.

As noted above, an objective of the resource allocation in the edge computing network 306 is to guarantee that an applicable delay constraint denoted as Tj, where j represents the assured delay level, is met between the user and the datacenters that provide services to the user at all times. Each combination of a wireless access point i and a delay level j may be referred to as a delay assured access point denoted as DAAij, where i is an identifier of a wireless access point. In FIG. 3A, the datacenters meeting the objective for each delay assured access point are grouped and labeled with the corresponding DAAij identifier.

In the illustrated example, the only datacenter meeting the objective for DAA12, which corresponds to wireless access point WA1 (340) and assured delay level T2, is shown within the dashed circle labeled DAA12 (350) in FIG. 3A. In this case, DAA12(WA1, T2)={DC4}. In other words, the only datacenter that is accessible through wireless access point WA1 (340) and that meets the assured delay level T2 is datacenter DC4 (332). Similarly, the only datacenter meeting the objective for DAA32, which corresponds to wireless access point WA3 (344) and assured delay level T2, is shown within the dashed circle labeled DAA32 (354) in FIG. 3A. In this case, DAA32(WA3, T2)={DC5}. In other words, the only datacenter that is accessible through wireless access point WA3 (344) and that meets the assured delay level T2 is datacenter DC5 (334).

In the illustrated example, the datacenters meeting the objective for DAA22, which corresponds to wireless access point WA2 (342) and assured delay level T2, are shown within the dashed ellipse labeled DAA22 (352). In this case, DAA22(WA2, T2)={DC2, DC5}. In other words, the only datacenters that are accessible through wireless access point WA2 (342) and that meet the assured delay level T2 are datacenters DC2 (322) and DC5 (334). Similarly, the datacenters meeting the objective for DAA42, which corresponds to wireless access point WA4 (346) and assured delay level T2, are shown within the dashed ellipse labeled DAA42 (356). In this case, DAA42(WA4, T2)={DC1, DC3}. In other words, the only datacenters that are accessible through wireless access point WA4 (346) and that meet the assured delay level T2 are datacenters DC1 (312) and DC3 (324). In addition, the datacenters meeting the objective for DAA52, which corresponds to wireless access point WA5 (348) and assured delay level T2, are shown within the dashed ellipse labeled DAA52 (358). In this case, DAA52(WA5, T2)={DC3, DC6}. In other words, the only datacenters that are accessible through wireless access point WA5 (348) and that meet the assured delay level T2 are datacenters DC3 (324) and DC6 (336).

Figure 4:
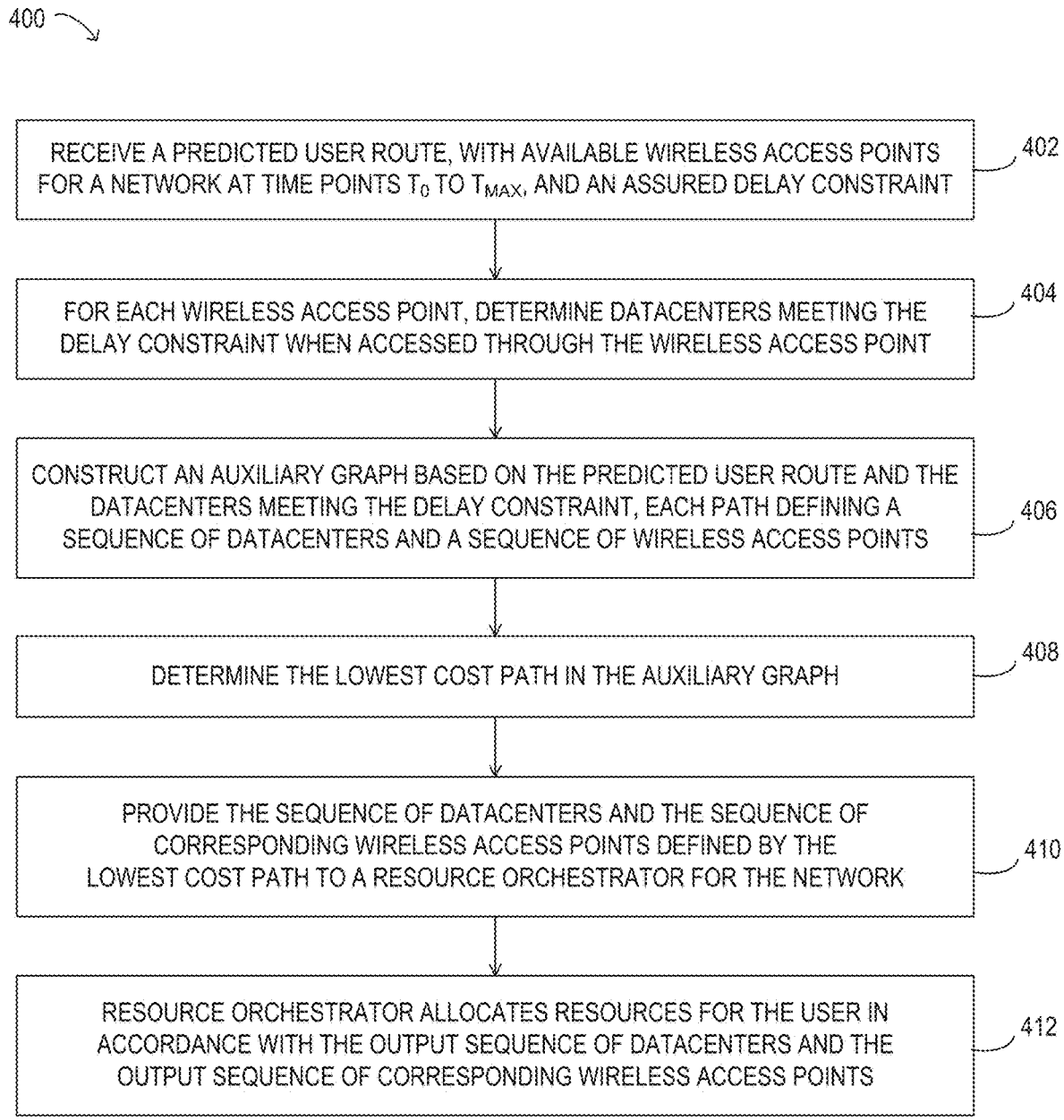
FIG. 4 is a flow diagram illustrating selected elements of a method for allocating resources for a mobile user traveling along a predicted route while minimizing datacenter migrations and meeting an assured delay level, according to one embodiment.

An example method for allocating resources to a mobile user such that an applicable assured delay Tj between a mobile user and the datacenters that provide storage and/or computing services to the mobile user is guaranteed at all times and in which migration costs are minimized is illustrated in FIG. 4 and described below, according to at least some embodiments. The method may include, for example, constructing an auxiliary graph including the costs associated with various sequences of resources along a user route and finding the shortest, or lowest cost, path from a source node to a destination node in the graph. The costs may be determined based on information obtained by one or more monitoring elements and the sequences of resources associated with the lowest cost path may be provided to a resource orchestrator configured to allocate resources to the mobile user as the mobile user moves along the user route.

Figure 3B:
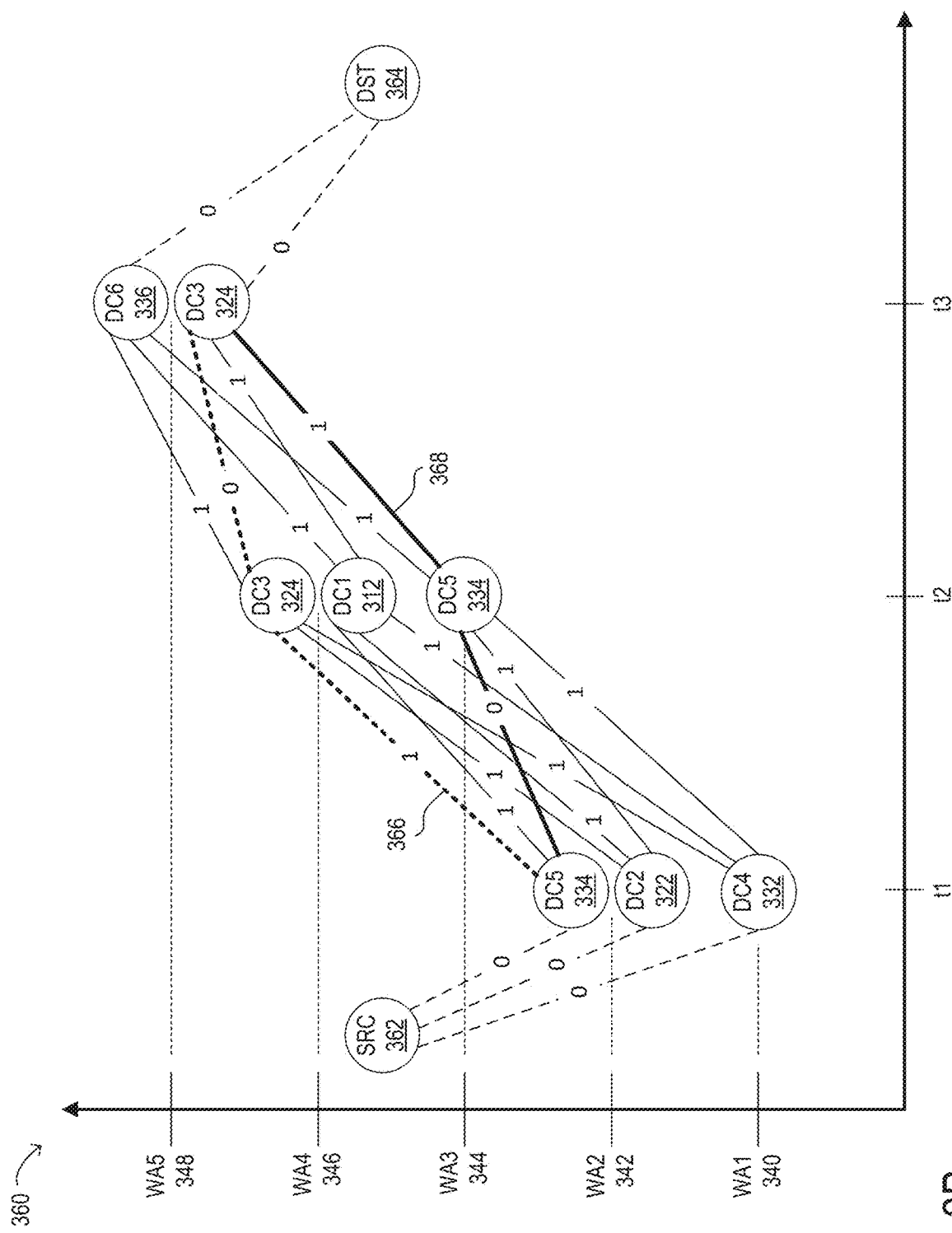
FIG. 3B illustrates an auxiliary graph for the system and the predicted user route shown in FIG. 3A, according to one embodiment.
Figure 5:
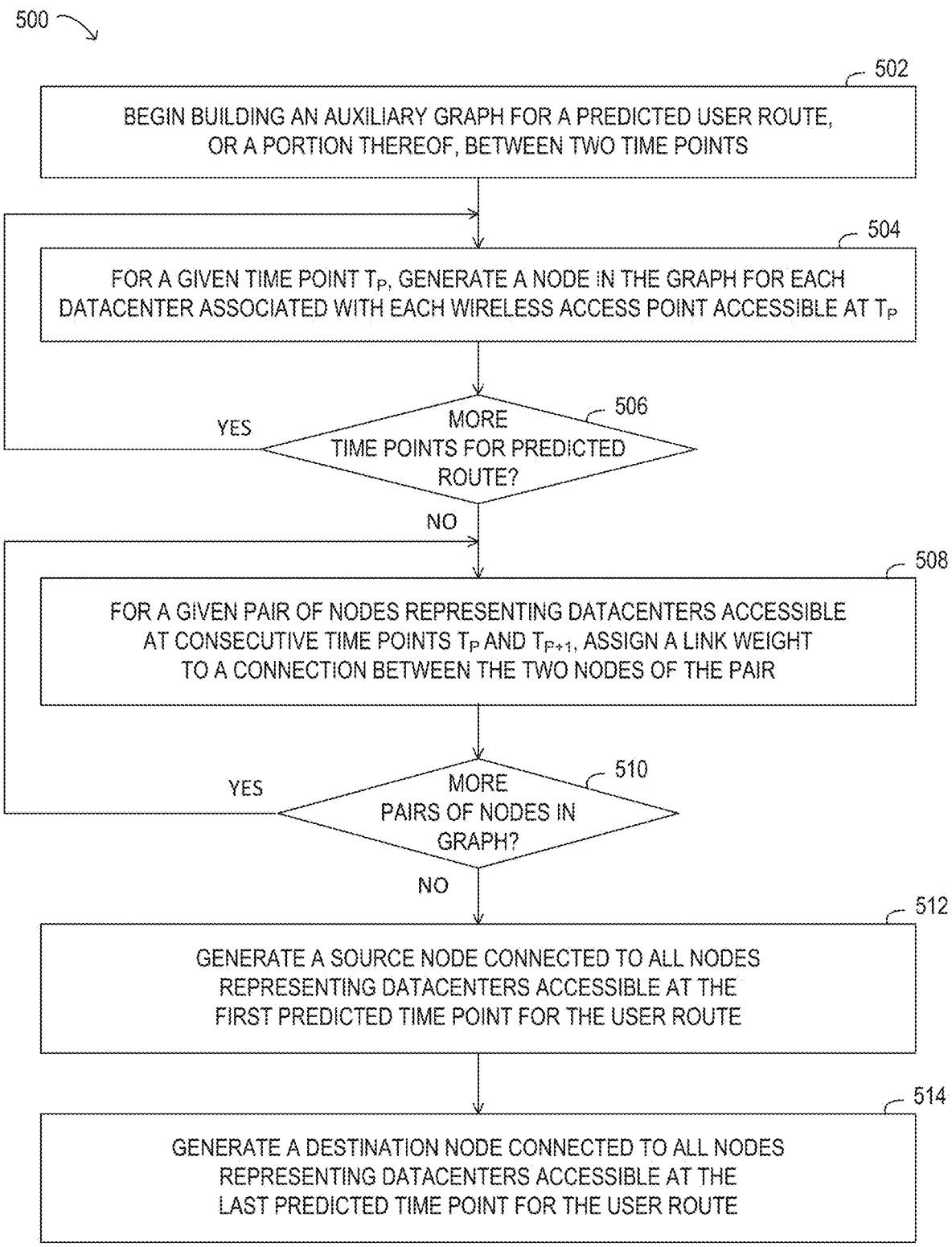
FIG. 5 is a flow diagram illustrating selected elements of a method for constructing an auxiliary, according to one embodiment.

FIG. 3B illustrates an auxiliary graph 360 for system 300 and the predicted user route shown in timeline 308 in FIG. 3A, according to one embodiment. An example method for constructing an auxiliary graph such as auxiliary graph 360 is illustrated in FIG. 5 and described below, according to at least some embodiments. In the illustrated example, the predicted time points of the predicted user route are shown on the x axis and the wireless access points through which particular datacenters of edge computing network 306 are accessible are shown on the y axis. As described above, only the datacenters that meet the assured delay level T2 when accessed by one or more of the wireless access points at a respective time point are included in auxiliary graph 360. For example, at time $t_1$, the available datacenters meeting the assured delay constraint are DC4 (332), which is accessed through WA1 (340), DC2 (322), which is accessed through WA2 (342), and DC5 (334), which is also accessed through WA2 (342). At time $t_2$, the available datacenters meeting the assured delay constraint are DC5 (334), which is accessed through WA3 (344), DC1 (312), which is accessed through WA4 (346), and DC3 (324), which is also accessed through WA4 (346). At time $t_3$, the available datacenters meeting the assured delay constraint are DC3 (324), which is accessed through WA5 (348), and DC6 (336), which is also accessed through WA5 (348). Auxiliary graph 360 also includes a source node (362), which is connected to each of the datacenter nodes accessible at time $t_1$, which is the first predicted time point on the predicted user route, and a destination node 364), which is connected to each of the datacenter nodes accessible at time $t_3$, which is the last predicted time point on the predicted user route.

In the illustrated example, link weights are assigned to the connections between pairs of datacenter nodes that are accessible at consecutive time points. For example, link weights are assigned to respective connections between each datacenter node that is accessible at time $t_1$ and each datacenter node that is accessible at time $t_2$. Link weights are also assigned to respective connections between each datacenter node that is accessible at time $t_2$ and each datacenter node that is accessible at time $t_3$. In the illustrated embodiment, in which an objective is to minimize the number of migrations of a user's data and/or computing tasks between datacenters, each connection between two different datacenters at consecutive time points is assigned a link weight of "1" and each connection from a datacenter to itself at consecutive time points is assigned a link weight of "0." For example, the link weight assigned to the connection between datacenter DC2 (322) at time $t_1$ and DC5 (334) at time $t_2$ is shown as "1", while the link weight assigned the connection between datacenter DC5 (334) at time $t_1$ and DC5 (334) at time $t_2$ is shown as "0."

In some embodiments, each connection between two different datacenters at consecutive time points may be assigned a link weight based on another type of migration cost, such as a cost in time, bandwidth, or other resources associated with transmitting a user's data from one datacenter to another for storage, or a cost of instantiating a particular application or service function at a given datacenter so that a computing task can be migrated to the given datacenter. In other embodiments, the link weight assigned to each connection may be based on the absolute or relative loads of the two nodes, such as when an objective of the resource allocation is to balance the loads across the datacenters. In still other embodiments, the link weight assigned to each connection may be based on the distance between the datacenters, a monitored delay amount between the two datacenters, or the number of network hops between the two datacenters. For example, in edge computing network 206, there is only one network hop between datacenters DC5 (334) and DC3 (324), while there are two network hops between datacenters DC5 (334) and DC1 (312).

In at least some embodiments, the respective link weights assigned to each connection between the source node 362 and a datacenter node that is accessible at time $t_1$ may be zero, as shown in FIG. 3B. Similarly, the respective link weights assigned to each connection between the destination node 364 and a datacenter node that is accessible at time $t_3$ may be zero. The cost of each path between the source node 362 and the destination node 364 may be calculated as the sum of the link weight assigned to the connection between the source node 362 and a given datacenter node accessible at time $t_1$ (0), the link weight assigned to the connection between the given datacenter node accessible at time $t_1$ and a given datacenter node accessible at time $t_2$ (0 or 1), the link weight assigned to the connection between the given datacenter node accessible at time $t_2$ and a given datacenter node accessible at time $t_3$ (0 or 1), and the link weight assigned to the connection between the destination node 362 and the given datacenter node accessible at time $t_3$ (0).

In some embodiments, determining the lowest cost path in the auxiliary graph may include calculating the cost of each path according to a first cost parameter, such as a migration cost, determining that, according to the first cost parameter, two or more paths have the same lowest cost, and computing and comparing a second, smaller, cost parameter for each of the two or more paths that have the same lowest cost according to the first cost parameter to determine the lowest cost path according to the second cost parameter.

As illustrated in FIG. 3B, there may be multiple paths in the auxiliary graph that have the same lowest cost. In some embodiments, any of the multiple paths having the same lowest cost may be selected as the lowest cost path on which resources allocations are based. In other embodiments, a tie between paths having the same lowest cost based on a single cost parameter may be broken by considering one or more additional cost parameters and adjusting the link weights on the tied paths accordingly.

In the example illustrated in FIG. 3B, a lowest cost path 366, with a total migration cost of 1, includes datacenters DC5 (334), DC3 (324), and DC3 (324), in sequence. This path requires a single network hop and a single migration from DC5 (334) to DC3 (324). A second lowest cost path 368, which also has a total migration cost of 1, includes datacenters DC5 (334), DC5 (334), and DC3 (324), in sequence. This path also requires a single network hop and a single migration from DC5 (334) to DC3 (324), but at a different time. In this example, because the two lowest cost paths include the same datacenters and the same datacenter migration, it may be unlikely that the tie can be broken using other ones of the cost parameters described herein. In this case, the lowest cost path may be selected randomly from the two lowest cost paths 366 and 368. If path 366 is selected, the resource orchestrator may be provided with a sequence of datacenters DC5 (334), DC3 (324), and DC3 (324), in that order, which are accessed through wireless access points WA2 (342), WA4 (346), and WA5 (348) at times $t_1$, $t_2$, and $t_3$, respectively. Conversely, if path 368 is selected, the resource orchestrator may be provided with a sequence of datacenters DC5 (334), DC5 (334), and DC3 (324), in that order, which are accessed through wireless access points WA2 (342), WA3 (344), and WA5 (348) at times $t_1$, $t_2$, and $t_3$, respectively.

In embodiments in which the lowest cost paths do not include the same nodes in the same order, a tie between the two lowest cost paths determined based on the total number of datacenter migrations may be broken based on the number of hops between nodes on each of the lowest cost paths, the delays between nodes on each of the lowest cost paths, the absolute or relative loads on pairs of nodes on each of the lowest cost paths, the cost in time, bandwidth, or other resources associated with transmitting data between nodes on each of the lowest cost paths, or the cost of instantiating a particular application or service function on particular nodes on each of the lowest cost paths. For example, a smaller link weight (e.g., 0.0001*second-cost-parameter-value) may be computed and added to the respective link weight assigned to the connections between nodes on the lowest cost paths to break the tie.

Note that, in some embodiments, a single datacenter migration may be associated with multiple network hops. For example, as illustrated in FIG. 3A, a migration from datacenter DC5 (334) to datacenter DC1 (312) requires two hops: from datacenter DC5 (334) to datacenter DC3 (324) and from datacenter DC3 (324) to datacenter DC1 (312). However, because the user's data and computing tasks are not transmitted to, stored on, or instantiated on datacenter DC3 (324), there may be no migration costs associated with passing through this intermediate node when migrating the user's data and/or computing tasks from datacenter DC5 (334) to datacenter DC1 (312). Therefore, the link cost assigned to the connection between datacenter DC5 (334) at time $t_1$ and datacenter DC1 (312) at time $t_2$ may be 1, rather than 2.

FIG. 4 is a flow diagram illustrating selected elements of a method 400 for allocating resources for a mobile user traveling along a predicted route while minimizing datacenter migrations and meeting an applicable assured delay level between the user and the datacenters providing services to the user, according to one embodiment. In various embodiments, at least some of the operations of method 400 illustrated in FIG. 4 may be performed by a monitoring element or a resource orchestrator of a system that implements a monitoring-based edge computing service with delay assurance, such as system 200 illustrated in FIGS. 2A and 2B or system 300 illustrated in FIGS. 3A and 3B. It is noted that certain operations described in method 400 may be optional, may be repeated, or may be rearranged in different embodiments.

In this example embodiment, the method includes, at 402, receiving input data indicating a predicted user route, including wireless access points for an edge computing network available at multiple time points from an initial time point, $T_0$, to a last predicted time point, $T_{max}$, and an assured delay constraint.

At 404, the method includes, for each wireless access point, determining the datacenters, if any, that meet the assured delay constraint when accessed through the wireless access point.

At 406, method 400 includes constructing an auxiliary graph based on the predicted user route and the datacenters that have been determined to meet the assured delay constraint. Each path in the auxiliary graph defines a respective sequence of datacenters to which the user's data and/or tasks are to be migrated and a respective sequence of wireless access points through which those datacenters are accessible by the user.

At 408, the method includes determining the lowest cost path on the auxiliary graph. As described in detail herein, the lowest cost path may be determined based on respective link weights assigned to the connections between each pair of nodes representing adjacent datacenters in each candidate path. In some embodiments, the link weight for each such connection may be based on whether or not a migration of the user's data and/or computing tasks is required between the two nodes of the pair. In such embodiments, the lowest cost path may be the path on which the number of required migrations is lowest. In other embodiments, the link weight each such connection may be based on another type of migration cost, such as a cost in time, bandwidth, or other resources associated with transmitting a user's data from one datacenter to another for storage, or a cost of instantiating a particular application or service function at a given datacenter so that a computing task can be migrated to the given datacenter. In such embodiments, the lowest cost path may be the path for which the total cost of all datacenter migrations is lowest. In still other embodiments, the link weight for each connection may be based on the distance between the two nodes of a pair of nodes, a monitored delay amount between the two nodes, or the number of network hops between the two nodes. In such embodiments, the lowest cost path may be the shortest path, which may be calculated as the shortest total distance, the smallest total delay, or the smallest total number of network hops between the nodes on the path. In some embodiments, other cost parameters may be used to determine the lowest cost path instead of, or in addition to, those described herein.

As noted above, determining the lowest cost path in the auxiliary graph may include calculating the cost of each path according to a first cost parameter, such as a migration cost of 0 or 1, determining that, according to the first cost parameter, two or more paths have the same lowest cost, and computing and comparing a second cost parameter for each of the two or more paths that have the same lowest cost according to the first cost parameter to determine the lowest cost path according to the second cost parameter. In one example, to break a tie between two paths that have the same lowest cost when only migration costs are considered, an additional, smaller, link weight of (0.0001*second-cost-parameter-value) may be assigned to each of the connections between consecutive nodes on the paths that have the same lowest cost according to the migration costs only. The second cost parameter value may represent the number of network hops between the two nodes or a monitored delay amount between the two nodes, for example. The path having the lowest cost according to the second cost parameter may be selected as the lowest cost path in the auxiliary graph.

At 410, method 200 includes providing the sequence of datacenters and the sequence of corresponding wireless access points defined by the lowest cost path in the auxiliary graph to the resource orchestrator for the network as an input to a resource allocation operation.

At 412, the method includes the resource orchestrator allocating resources for the user's data and/or tasks in accordance with the sequence of datacenters and the sequence of corresponding wireless access points. For example, as the user moves along the predicted route, the resource orchestrator may, at different points in time, allocate resources at the wireless access points and datacenters defined by the lowest cost path for those points in time in sequence.

FIG. 5 is a flow diagram illustrating selected elements of a method 500 for constructing an auxiliary graph, such as auxiliary graph 360 illustrated in FIG. 3B, in accordance with some embodiments. In various embodiments, at least some of the operations of method 500 illustrated in FIG. 5 may be performed by a monitoring element or a resource orchestrator of a system that implements a monitoring-based edge computing service with delay assurance, such as system 200 illustrated in FIGS. 2A and 2B or system 300 illustrated in FIGS. 3A and 3B. It is noted that certain operations described in method 500 may be optional, may be repeated, or may be rearranged in different embodiments.

At 502, method 500 includes beginning to build an auxiliary graph for a predicted user route between two time points. In some embodiments, an auxiliary graph may be constructed for a predicted user route representing a predicted portion of a user route for which an end-to-end prediction might or might not be available.

At 504, the method includes, for a given time point $T_P$, generating a node in the auxiliary graph for each datacenter associated with each wireless access point accessible at time $T_P$. In some embodiments, generating a node in the auxiliary graph may include instantiating an instance of a node class that defines attributes of the node. An example class definition for a node representing one datacenter/wireless access point pair is shown below:

```
Class Node{
    datacenterNumber: {q}
    assuredDelayLevel: {j}
    belongsTo: {WAi}
    time:{T_P }
}
```

In the illustrated example, q is an identifier (e.g., a number) with which a datacenter is represented in the auxiliary graph, j is the assured delay level met by the datacenter/wireless access point pair, and i is an identifier (e.g., a number) of a wireless access point through which the datacenter is accessible at time $T_P$.

If, at 506, there are more predicted time points on the predicted user route, method 500 returns to 504, where additional nodes are generated for the datacenter/wireless access point pairs available at each additional predicted time point. If, or once, there are no additional predicted time points on the predicted user route, method 500 continues to 508.

At 508, the method includes, for a given pair of nodes representing datacenters accessible at consecutive time points $T_P$ and $T_{P+1}$, assigning a link weight to a connection between the two nodes of the given pair of nodes. As previously noted, a link weight of 1 or 0 may be assigned based on whether or not a migration of the user's data and/or computing tasks is required between the two nodes of the given pair, in some embodiments. In other embodiments, the link weight assigned to each connection may be based on the distance between the two datacenters represented by the nodes on the physical network, a monitored delay amount between the two nodes/datacenters, the number of network hops between the two nodes, or any combination of two or more cost parameters.

If, at 510, there are more pairs of nodes representing datacenters accessible at consecutive time points $T_P$ and $T_{P+1}$ in the auxiliary graph, method 500 returns to 508, where link weights are assigned to each additional pair of nodes.

If, or once, there are no additional pairs of nodes representing datacenters accessible at consecutive time points $T_P$ and $T_{P+1}$ in the auxiliary graph, method 500 may continue at 512.

At 512, the method includes generating a source node at a time $T_0$ that is connected to all nodes representing datacenters accessible at the first predicted time point for the predicted user route, $T_1$. A link weight of zero may be assigned to the respective connections between the source node and each of the nodes representing datacenters accessible at the first predicted time point.

At 514, the method includes generating a destination node that is connected to all nodes representing datacenters accessible at the last predicted time point for the predicted user route. A link weight of zero may be assigned to the respective connections between the destination node and each of the nodes representing datacenters accessible at the last predicted time point.

In some embodiments, it may be difficult to predict a very long user route with enough accuracy to predetermine the resources to be allocated on behalf of the user. In such embodiments, a predicted user route for which resources are allocated as described herein may represent a first portion of an extended user route that includes one or more additional, separately predicted portions along which one or more additional wireless access points for the edge computing network are available at one or more additional time points. In some such embodiments, the methods described herein for allocating resources for a given user as they move along the first portion of the extended route may be repeated to allocate resources for the given user as they move along each additional portion of the extended route. For example, in embodiments in which the extended user route includes the first portion and a second portion, method 400 illustrated in FIG. 4 may further include determining, for each additional wireless access point, one or more datacenters in the edge computing network for which the assured delay constraint is met when the datacenter is accessed through the additional wireless access point, and updating the auxiliary graph dependent on the second portion of the extended user route and the determination, for each additional wireless access point, of the one or more datacenters in the edge computing network for which the assured delay constraint is met when the datacenter is accessed through the additional wireless access point. Updating the auxiliary graph may include adding one or more additional nodes at each of the additional time points and adding one or more additional paths each defining an additional sequence of datacenters and an additional sequence of the additional wireless access points through which each datacenter in the additional sequence of datacenters is accessible. The method may also include determining the lowest cost one of the additional paths in the auxiliary graph, providing the additional sequence of datacenters and the additional sequence of the additional wireless access points defined by the lowest cost one of the additional paths to the resource orchestrator, and allocating, by the resource orchestrator, additional resources for the given user on the second portion of the extended user route in accordance with the additional sequence of datacenters and the additional sequence of wireless access points defined by the lowest cost one of the additional paths to the resource orchestrator.

In other embodiments in which a predicted user route for which resources are allocated as described herein represents a first predicted portion of extended user route that includes one or more additional portions, as yet unknown, along which one or more additional wireless access points for the edge computing network are available at one or more additional time points, some or all of the operations of method 400 illustrated in FIG. 4 may be repeated as the user's movements along the extended route are predicted for additional time points. For example, method 400 may further include, while the given user moves along the extended user route, dynamically determining, for each additional wireless access point, one or more datacenters in the edge computing network for which the assured delay constraint is met when the datacenter is accessed through the additional wireless access point, and dynamically updating the auxiliary graph dependent on the extended user route and the determination, for each additional wireless access point, of the one or more datacenters in the edge computing network for which the assured delay constraint is met when the datacenter is accessed through the additional wireless access point. In this case, updating the auxiliary graph may include extending the lowest cost path to include an extension of the respective sequence of datacenters and an extension of the respective sequence of wireless access points defined by the lowest cost path, and the method may also include providing the extended sequence of datacenters and the extended sequence of wireless access points to the resource orchestrator, and allocating, by the resource orchestrator, additional resources for the given user on the extended user route in accordance with the extended sequence of datacenters and the extended sequence of wireless access points.

Figure 6:
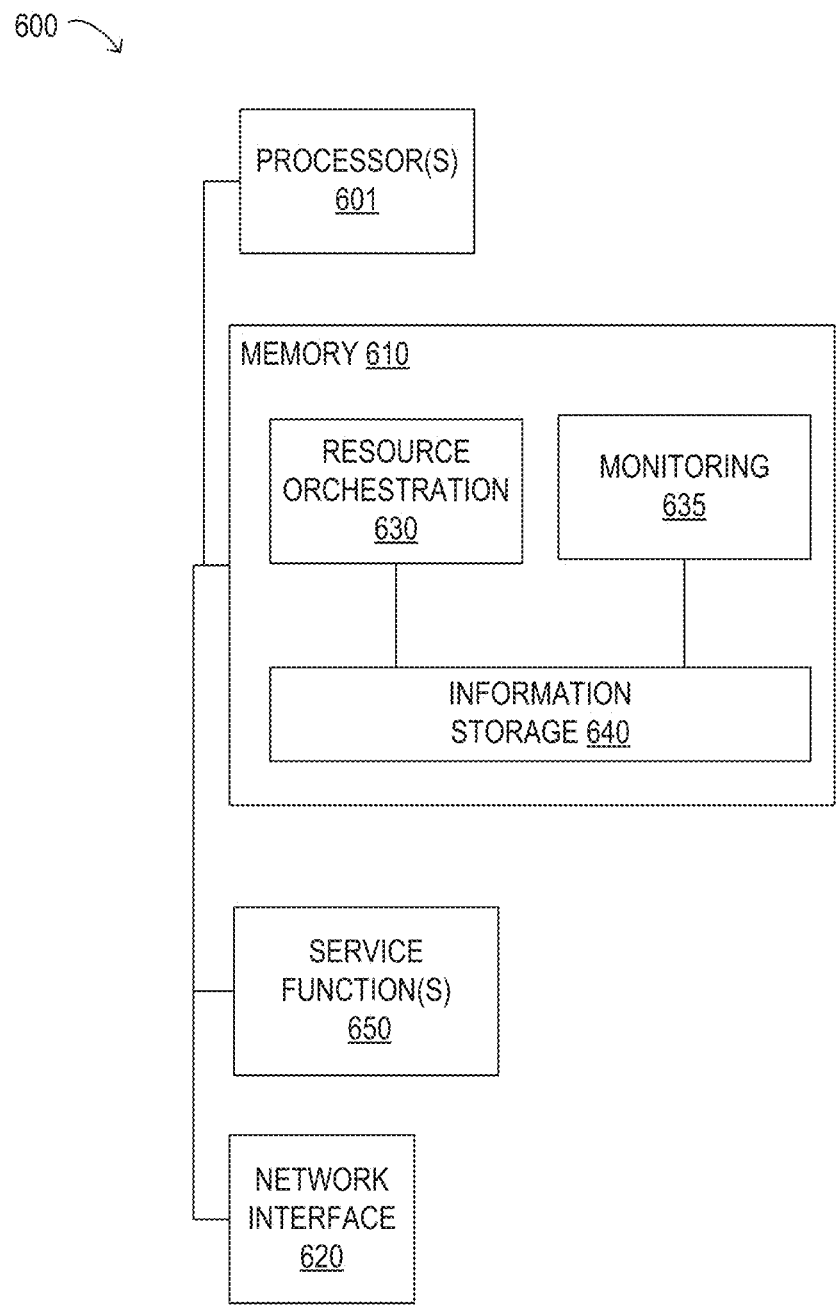
FIG. 6 is a block diagram illustrating selected elements of an example network element, according to at least some embodiments.

Referring now to FIG. 6, a block diagram of selected elements of an example network element 600 is illustrated, according to at least some embodiments. In FIG. 6, network element 600 is represented as a computer system including physical and logical components for implementing any of the network elements in an edge computing network. In various embodiments, a network element similar to network element 600 may implement any of the network elements 112 illustrated in FIG. 1, any of the resource orchestrators described herein (such as resource orchestrator 108 illustrated in FIG. 1, orchestration element 202 illustrated in FIGS. 2A and 2B, or orchestration element 302 illustrated in FIGS. 3A and 3B), any of the monitoring elements described herein (such as monitoring element 204 illustrated in FIGS.

2A and 2B, or monitoring element 304 illustrated in FIGS. 3A and 3B), or a network controller (such as an SDN controller for network or a particular domain in a multi-domain network), as described herein. However, some of these network elements may not include all of the components illustrated in FIG. 6, in some embodiments. In other embodiments, any of the network elements described herein may include more, fewer, or different components than those included in the example embodiment illustrated in FIG. 6.

As illustrated in this example, network element 600 may, accordingly, include one or more processors 601, memory 610, one or more service functions 650, and a network interface 620. Processor 601 may represent one or more individual processing units and may execute program instructions, interpret data, and process data stored by memory 610 or another component within network element 600 to implement the functionality of any of the network elements described herein, in different embodiments. In this example embodiment, each service function 650 may represent circuitry, logic, and/or program instructions for implementing any of a variety of functions on behalf of a user including, but not limited to, network services, storage functions, and/or computing tasks.

In FIG. 6, memory 610 may be communicatively coupled to processor 601 and may comprise a system, device, or apparatus suitable to retain program instructions and data for a period of time (e.g., non-transitory computer-readable media). Memory 610 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory. Non-volatile memory refers to a memory that retains data after power is turned off. It is noted that memory 610 may include different numbers of physical storage devices, in various embodiments.

As shown in FIG. 6, memory 610 may include instructions to implement functionality of a resource orchestration element 630 and/or a monitoring element 635. Resource orchestration element 630 and monitoring element 635 may, individually or collectively, perform any or all of the operations of method 400 illustrated in FIG. 4 or of method 500 illustrated in FIG. 5, in different embodiments, among other functionality described in the present disclosure. Memory 610 may also include information storage 640, which may store information usable by resource orchestration element 630 and/or a monitoring element 635 including, but not limited to, data representing an observed or predicted user route, monitored delay data, monitored network topology data, data representing an auxiliary graph including nodes representing datacenters and link weights assigned to connections between nodes, data representing one or more assured delay levels, data indicating a respective cost associated with each of multiple paths in an auxiliary graph, data identifying a lowest cost path in an auxiliary graph, data defining a sequence of datacenters and a corresponding sequence of wireless access points through which a mobile user can access the datacenters in the sequence of datacenters at different points in time, or values of any default or configurable parameters used to implement the functionality described herein or any other functionality of network element 600.

In at least some embodiments, the systems and methods described herein may consider the unique conditions applicable in 5G edge computing, including the availability of multiple wireless access points and an assured delay constraint between a user and the edge nodes that provide storage and computing services to the user, when determining resource allocations for user-mobility based VM migration. In at least some embodiments, the systems and methods described herein use predicted user routes and a guaranteed delay constraint to construct an auxiliary graph from which to calculate and output a migration sequence between edge computing nodes and a corresponding sequence of wireless access points through which a mobile user can access the edge computing nodes in the migration sequence. In some embodiments, the techniques described herein may be used to reduce the costs of migrating a user's data and/or computing tasks between edge computing nodes within an edge computing system that provides "follow me" services. In some embodiments, the resource allocation techniques described herein may provide additional technical benefits. For example, they may allow 5G edge computing networks to support mission-critical, delay-sensitive services for applications such as Internet of Things (IoT) platforms, auto-driving cars, and service-oriented slicing.

In various embodiments, the systems and methods described herein may, in some embodiments, be used to allocate, coordinate and/or control resources implemented on the 1Finity™ platform from Fujitsu Network Communications Inc. that cover access, metro, core, and datacenter networks. In general, in at least some embodiments of the present disclosure, the techniques described herein may be applied to systems in which large-scale, multi-domain, multi-layer network problems span service functions, virtual machines, data centers, switching systems, and the Internet of Things.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for allocating resources among edge computing nodes, comprising:
receiving input data indicating a predicted user route and an assured delay constraint, the input data specifying a plurality of wireless access points for an edge computing network available along the predicted user route at each of multiple time points;
determining, for each of the plurality of wireless access points, one or more datacenters in the edge computing network for which the assured delay constraint is met when the datacenter is accessed through the wireless access point;
constructing an auxiliary graph dependent on the predicted user route and the determination, for each wireless access point, of the one or more datacenters in the edge computing network for which the assured delay constraint is met when the datacenter is accessed through the wireless access point, wherein each of the datacenters is represented by at least one node in the auxiliary graph and each of multiple paths in the auxiliary graph defines a respective sequence of datacenters and a respective sequence of wireless access points through which each of the datacenters in the sequence of datacenters is accessible;
determining a lowest cost one of the multiple paths in the auxiliary graph;

providing the respective sequence of datacenters and the respective sequence of wireless access points defined by the lowest cost path in the auxiliary graph to a resource orchestrator for the edge computing network; and allocating, by the resource orchestrator, resources for a given user on the predicted user route in accordance with the respective sequence of datacenters and the respective sequence of wireless access points defined by the lowest cost path, wherein constructing the auxiliary graph comprises:
 for each of the multiple time points, generating a node in the auxiliary graph for each datacenter associated with each wireless access point accessible at the time point;
 for each pair of nodes in the auxiliary graph representing datacenters accessible at consecutive ones of the multiple time points, assigning a respective link weight to a connection between the two nodes of the pair of nodes in the auxiliary graph that is dependent on a cost of migrating data between the two nodes of the pair of nodes or a cost of migrating a computation task between the two nodes of the pair of nodes, wherein a value of 1 is assigned to the connection when the two nodes represent differing data centers, and a value of 0 is assigned to the connection when the two nodes represent the same datacenter; and determining the lowest cost path in the auxiliary graph is dependent on the respective link weights assigned to the connections between the two nodes of each pair of nodes in the auxiliary graph representing datacenters accessible at consecutive ones of the multiple time points, wherein determining the lowest cost path in the auxiliary graph comprises:
 determining that, according to a first cost parameter, two or more paths have a same lowest cost;
 determining that each of the two or more paths do not include the same nodes in a same order sequence; and
 in response to determining that i) two or more paths have the same lowest cost and that ii) each of the two or more paths do not include the same nodes in the same order sequence, identify the lowest cost path from the two or more paths based on a number of hops between nodes on each of the two or more paths.

2. The method of claim 1, wherein:
constructing the auxiliary graph further comprises:
 generating a source node connected to all nodes representing datacenters accessible at a first predicted time point of the multiple time points; and
 generating a destination node connected to all nodes representing datacenters accessible at a last predicted time point of the multiple time points; and
each of the multiple paths in the auxiliary graph defines a respective sequence of datacenters and a respective sequence of wireless access points represented by nodes between the source node and the destination node in the path.

3. The method of claim 1, wherein, for each pair of nodes in the auxiliary graph representing datacenters accessible at consecutive ones of the multiple time points, assigning the respective link weight is dependent on a number of hops between the two nodes of the pair of nodes.

4. The method of claim 1, wherein the predicted user route is specific to the given user.

5. The method of claim 1, wherein determining, for each of the plurality of wireless access points, the one or more datacenters in the edge computing network for which the assured delay constraint is met when the datacenter is accessed through the wireless access point comprises:
 monitoring delay amounts between pairs of datacenters; and
 monitoring delay amounts between datacenters and the wireless access points through which they are accessed.

6. The method of claim 1, wherein:
the predicted user route represents a first portion of an extended user route that includes a second portion along which one or more additional wireless access points for the edge computing network are available at one or more additional time points; and
the method further includes:
 determining, for each additional wireless access point, one or more datacenters in the edge computing network for which the assured delay constraint is met when the datacenter is accessed through the additional wireless access point;
 updating the auxiliary graph dependent on the second portion of the extended user route and the determination, for each additional wireless access point, of the one or more datacenters in the edge computing network for which the assured delay constraint is met when the datacenter is accessed through the additional wireless access point, the updating including adding one or more additional nodes at each of the additional time points and adding one or more additional paths each defining an additional sequence of datacenters and an additional sequence of the additional wireless access points through which each datacenter in the additional sequence of datacenters is accessible;
 determining a lowest cost one of the additional paths in the auxiliary graph;
 providing the additional sequence of datacenters and the additional sequence of the additional wireless access points defined by the lowest cost one of the additional paths to the resource orchestrator; and
 allocating, by the resource orchestrator, additional resources for the given user on the second portion of the extended user route in accordance with the additional sequence of datacenters and the additional sequence of wireless access points defined by the lowest cost one of the additional paths to the resource orchestrator.

7. The method of claim 1, wherein:
the predicted user route represents a portion of an extended user route along which one or more additional wireless access points for the edge computing network are available at one or more additional time points; and
the method further includes, while the given user moves along the extended user route:
 dynamically determining, for each additional wireless access point, one or more datacenters in the edge computing network for which the assured delay constraint is met when the datacenter is accessed through the additional wireless access point;
 dynamically updating the auxiliary graph dependent on the extended user route and the determination, for each additional wireless access point, of the one or more datacenters in the edge computing network for which the assured delay constraint is met when the datacenter is accessed through the additional wireless access point, the updating including extending the lowest cost path to include an extension of the respective sequence of datacenters and an extension of the respective sequence of wireless access points defined by the lowest cost path; and providing the extended sequence of datacenters and the extended sequence of wireless access points to the resource orchestrator; and allocating, by the resource orchestrator, additional resources for the given user on the extended user route in accordance with the extended sequence of datacenters and the extended sequence of wireless access points.

8. The method of claim 1, wherein one or more of the datacenters can be associated with two or more of the wireless access points at two or more respective time points.

9. A system for allocating resources among edge computing nodes, comprising:
an edge computing network including a plurality of datacenters;
a plurality of wireless access points, each configured to access a subset of the plurality of datacenters on behalf of users;
a resource orchestrator; and
a monitoring subsystem comprising a first processor having access to memory media storing first instructions executable by the first processor to:
receive input data indicating a predicted user route associated with an assured delay constraint, the input data specifying a subset of the plurality of wireless access points available along the predicted user route at each of multiple time points;
determine, for each wireless access point in the subset of wireless access points, one or more datacenters in the subset of datacenters accessible by the wireless access point for which the assured delay constraint is met when the datacenter is accessed through the wireless access point;
construct an auxiliary graph dependent on the predicted user route and the determination of the one or more of the subset of datacenters accessible by each wireless access point for which the assured delay constraint is met when the datacenter is accessed through the wireless access point, wherein each of the one or more datacenters of the subset of datacenters accessible by each wireless access point is represented by at least one node in the auxiliary graph and each of multiple paths in the auxiliary graph defines a respective sequence of datacenters and a respective sequence of wireless access points through which each of the datacenters in the sequence of datacenters is accessible;
determine a lowest cost one of the multiple paths in the auxiliary graph;
provide the respective sequence of datacenters and the respective sequence of wireless access points defined by the lowest cost path in the auxiliary graph to the resource orchestrator;
wherein the resource orchestrator comprises a second processor having access to memory media storing second instructions executable by the second processor to allocate resources for a given user on the predicted user route in accordance with the respective sequence of datacenters and the respective sequence of wireless access points defined by the lowest cost path, wherein to construct the auxiliary graph, the first instructions are further executable to cause the first processor to:

for each of the multiple time points, generate a node in the auxiliary graph for each datacenter associated with each wireless access point accessible at the time point; and for each pair of nodes in the auxiliary graph representing datacenters accessible at consecutive ones of the multiple time points, assign a respective link weight to a connection between the two nodes of the pair of nodes in the auxiliary graph that is dependent on a cost of migrating data between the two nodes of the pair of nodes or a cost of migrating a computation task between the two nodes of the pair of nodes, wherein a value of 1 is assigned to the connection when the two nodes represent differing data centers, and a value of 0 is assigned to the connection when the two nodes represent the same datacenter; and determining the lowest cost path in the auxiliary graph is dependent on the respective link weights assigned to the connections between the two nodes of each pair of nodes in the auxiliary graph representing datacenters accessible at consecutive ones of the multiple time points, wherein determining the lowest cost path in the auxiliary graph comprises:
determining that, according to a first cost parameter, two or more paths have a same lowest cost;
determining that each of the two or more paths do not include the same nodes in a same order sequence; and
in response to determining that i) two or more paths have the same lowest cost and that ii) each of the two or more paths do not include the same nodes in the same order sequence, identify the lowest cost path from the two or more paths based on a number of hops between nodes on each of the two or more paths.

10. The system of claim 9, wherein the plurality of datacenters includes one or more datacenters at an edge computing layer, one or more datacenters at a fog computing layer closer to the users on whose behalf the plurality of wireless access points access the subsets of the plurality of datacenters than the one or more datacenters at the edge computing layer, and one or more datacenters at a cloud computing layer farther from the users on whose behalf the plurality of wireless access points access the subsets of the plurality of datacenters than the one or more datacenters at the edge computing layer.

11. The system of claim 9, wherein the first instructions are further executable to cause the first processor to determine the assured delay constraint for the predicted user route.

12. The system of claim 9, wherein:
to construct the auxiliary graph, the first instructions are further executable to cause the first processor to:
generate a source node connected to all nodes representing datacenters accessible at a first predicted time point of the multiple time points; and
generate a destination node connected to all nodes representing datacenters accessible at a last predicted time point of the multiple time points; and
each of the multiple paths in the auxiliary graph defines a respective sequence of datacenters and a respective sequence of wireless access points represented by nodes between the source node and the destination node in the path.

13. The system of claim 9, wherein, for each pair of nodes in the auxiliary graph representing datacenters accessible at consecutive ones of the multiple time points, the first instructions are further executable to cause the first processor to assign the respective link weight dependent on a number of hops between the two nodes of the pair of nodes.

14. The system of claim 9, wherein the first instructions are further executable to cause the first processor to determine the predicted user route dependent on monitoring data associated with the given user.

15. The system of claim 9, wherein to determine, for each wireless access point in the subset of wireless access points, the one or more datacenters in the subset of datacenters accessible by the wireless access point for which the assured delay constraint is met when the datacenter is accessed through the wireless access point, the first instructions are further executable to cause the first processor to:
 monitor delay amounts between pairs of datacenters; and
 monitor delay amounts between datacenters and the wireless access points through which they are accessed.

16. The system of claim 9, wherein:
 the predicted user route represents a portion of an extended user route along which one or more additional wireless access points for the edge computing network are available at one or more additional time points; and
 the first instructions are further executable to cause the first processor to, while the given user moves along the extended user route:
  dynamically determine, for each additional wireless access point, one or more datacenters in the edge computing network for which the assured delay constraint is met when the datacenter is accessed through the additional wireless access point;
  dynamically update the auxiliary graph dependent on the extended user route and the determination, for each additional wireless access point, of the one or more datacenters in the edge computing network for which the assured delay constraint is met when the datacenter is accessed through the additional wireless access point, the updating including extending the lowest cost path to include an extension of the respective sequence of datacenters and an extension of the respective sequence of wireless access points defined by the lowest cost path; and
  provide the extended sequence of datacenters and the extended sequence of wireless access points to the resource orchestrator; and
 the second instructions are further executable to cause the second processor to allocate additional resources for the given user on the extended user route in accordance with the extended sequence of datacenters and the extended sequence of wireless access points.

* * * * *